(12) United States Patent
Shabi et al.

(10) Patent No.: US 11,748,015 B2
(45) Date of Patent: Sep. 5, 2023

(54) EXTENDING SIMILARITY-BASED DEDUPLICATION TO ADJACENT DATA

(71) Applicant: EMC IP Holding Company LLC, Hopkinton, MA (US)

(72) Inventors: Uri Shabi, Tel Mond (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 169 days.

(21) Appl. No.: 17/238,303

(22) Filed: Apr. 23, 2021

(65) Prior Publication Data

US 2022/0342574 A1    Oct. 27, 2022

(51) Int. Cl.
G06F 3/06    (2006.01)
(52) U.S. Cl.
CPC ............ *G06F 3/0641* (2013.01); *G06F 3/067* (2013.01); *G06F 3/0608* (2013.01); *G06F 3/0659* (2013.01)

(58) Field of Classification Search
None
See application file for complete search history.

(56) References Cited

U.S. PATENT DOCUMENTS

| 10,498,355 | B2 | 12/2019 | Hong et al. | |
|---|---|---|---|---|
| 2012/0137061 | A1* | 5/2012 | Yang | G06F 3/0616 711/E12.008 |
| 2013/0243190 | A1* | 9/2013 | Yang | G06F 3/0616 380/44 |
| 2017/0038978 | A1* | 2/2017 | Li | G06F 3/0611 |
| 2021/0132813 | A1 | 5/2021 | Shabi et al. | |
| 2021/0132835 | A1 | 5/2021 | Shabi et al. | |

OTHER PUBLICATIONS

Kabishcer, Alexei, et al.; "Facilitating Data Reduction Using Weighted Similarity Digest," U.S. Appl. No. 17/081,007, filed Oct. 27, 2020.
"Similarity Deduplication," U.S. Appl. No. 17/155,224, filed Jan. 22, 2021.

* cited by examiner

*Primary Examiner* — Michael Alsip
(74) *Attorney, Agent, or Firm* — BainwoodHuang

(57) ABSTRACT

A technique of performing data reduction includes, upon detecting a match between similarity hashes of a candidate dataset and a target dataset, evaluating an adjacent candidate dataset and an adjacent target dataset for similarity with each other and, in response to confirming such similarity, performing data reduction of the adjacent candidate dataset with reference to the adjacent target dataset.

17 Claims, 5 Drawing Sheets

EXTENDING SIMILARITY-BASED DEDUPLICATION TO ADJACENT DATA

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Data storage systems commonly employ data reduction facilities, such as lossless compression and/or deduplication. Lossless compression works by removing redundancy within a dataset, such that the compressed size of the dataset is smaller than its uncompressed size. Deduplication involves identifying duplicate copies of the same data and replacing duplicates with references to retained versions. In a common deduplication scheme, a storage system maintains an index that associates digests of datasets with corresponding locations where those datasets can be found. Digests are generally provided as hash values, e.g., computed using a cryptographic or semi-cryptographic hash function. When examining a new dataset to determine whether it is a duplicate of one that is already stored, a storage system may hash the new dataset and perform a lookup into the index for a matching digest. Assuming no hash collisions, a match of digests confirms a match of datasets. The storage system may then effectuate storage of the new dataset by providing a reference to the location that the index associates with the matching digest. Redundant storage of the contents of the new dataset is therefore avoided.

SUMMARY

A limitation of the above-described deduplication scheme is that hash functions are capable only of identifying exact matches. Owing to the randomizing nature of hash functions, very small differences in datasets can produce arbitrarily large differences in hash values. Thus, conventional hash functions are not useful for gauging similarity among datasets. The ability to gauge similarity would be a useful feature for storage systems to possess, however.

Efforts have been underway to develop digests that provide matches for similar data, not merely for identical data, thus overcoming the limitation of requiring exact data matches. Such digests are referred to herein as similarity hashes, or "sim-hashes." A promising application of sim-hashes is to enhance data deduplication. For example, sim-hashes may be used in deduplication indices in place of conventional hash values to expand the scope of digest matches to similar data sets, in addition to identical ones.

Unfortunately, sim-hashes may be too strict for certain purposes. For example, two sim-hashes may produce different results even though the respective data sets share much of the same data. Thus, a mismatch of sim-hashes does not necessarily mean that datasets are not similar.

Consider a case where a new dataset arrives as part of a sequence of multiple datasets. If a sim-hash-based deduplication finds a match between the new dataset and a target dataset, there is better than a random chance that datasets adjacent to the candidate dataset are also similar to corresponding datasets adjacent to the target dataset. Yet sim-hashes may not reveal this similarity. Good opportunities for data reduction may be lost. What is needed, therefore, is a way of leveraging a sim-hash match to adjacent datasets to promote more thorough data reduction.

To address this need at least in part, an improved technique of performing data reduction includes, upon detecting a match between similarity hashes of a candidate dataset and a target dataset, evaluating an adjacent candidate dataset and an adjacent target dataset for similarity with each other and, in response to confirming such similarity, performing data reduction of the adjacent candidate dataset with reference to the adjacent target dataset.

Advantageously, the improved technique enables data reduction choices to be made based on similarity, thus promoting more effective data reduction and a more efficient use of computing resources.

Certain embodiments are directed to a method of performing data reduction. The method includes receiving a sequence of datasets to be written in a data storage system, the sequence of datasets including a candidate dataset and an adjacent candidate dataset. Upon detecting a match between similarity hashes of the candidate dataset and a target dataset, the method further includes performing a similarity assessment between the adjacent candidate dataset and an adjacent target dataset adjacent to the target dataset. Further, in response to the similarity assessment determining that the adjacent candidate dataset and the adjacent target dataset are similar to at least a predetermined degree, the method includes performing a data reduction operation on the adjacent candidate dataset with reference to the adjacent target dataset.

Other embodiments are directed to a computerized apparatus constructed and arranged to perform a method of performing data reduction, such as the method described above. Still other embodiments are directed to a computer program product. The computer program product stores instructions which, when executed on control circuitry of a computerized apparatus, cause the computerized apparatus to perform a method of performing data reduction, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique of performing data reduction includes, upon detecting a match between similarity hashes of a candidate dataset and a target dataset, evaluating an adjacent candidate dataset and an adjacent target dataset for similarity with each other and, in response to confirming such similarity, performing data reduction of the adjacent candidate dataset with reference to the adjacent target dataset.

Figure 1:
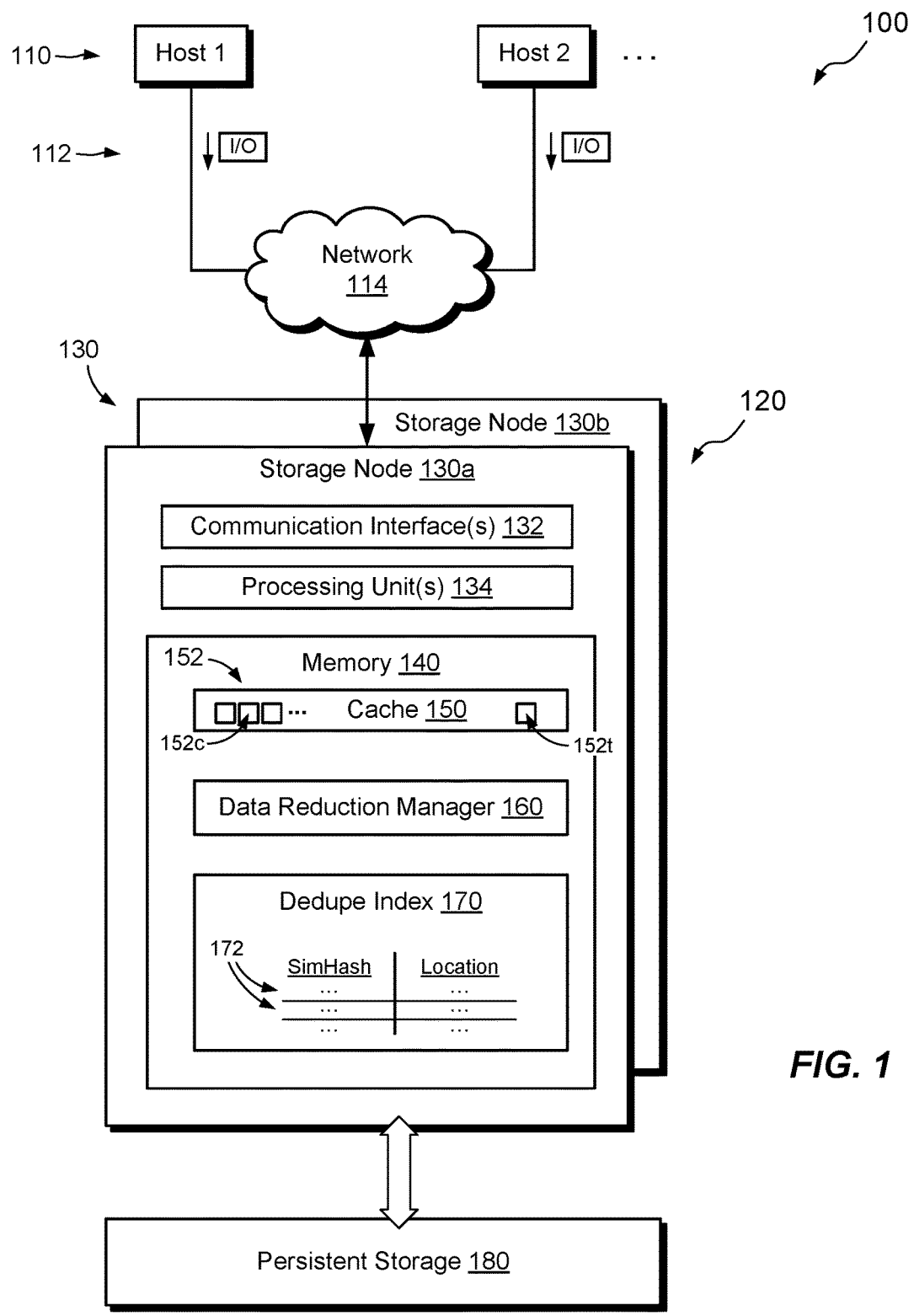
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 120 over a network 114. The data storage system 120 includes storage nodes 130 (e.g., 130a and 130b), also referred to herein as storage processors or "SPs," and persistent storage 180, such as magnetic disk drives, electronic flash drives, and/or the like. The storage nodes 130 may be provided as circuit board assemblies (e.g., blades), which plug into a chassis that encloses and cools them. The chassis has a backplane or midplane for interconnecting the nodes 120, and additional connections may be made among nodes using cables. In some examples, the nodes 130 are part of a storage cluster, such as one which contains any number of storage appliances, where each appliance includes a pair of nodes 130 connected to shared storage devices. No particular hardware configuration is required, however, as any number of nodes may be provided, including a single node, in any arrangement, and the node or nodes 130 can be any type of computing device capable of running software and processing host I/O (input/output) requests.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to a node 130 using various technologies, such as Fibre Channel, iSCSI (Internet small computer system interface), NVMe-oF (non-volatile memory express (NVME) over Fabrics), NFS (network file system), and CIFS (common Internet file system), for example. As is known, Fibre Channel, iSCSI, and NVMe-oF are block-based protocols, whereas NFS and CIFS are file-based protocols. Each storage node 130 is configured to receive I/O requests from hosts 110 according to block-based and/or file-based protocols and to respond to such I/O requests by reading or writing the storage 180.

Each of the storage nodes 130 may include one or more communication interfaces 132, a set of processing units 134, and memory 140. The communication interfaces 132 include, for example, SCSI target adapters and/or network interface adapters for converting electronic and/or optical signals received over the network 114 to electronic form for use by the storage node 130. The set of processing units 134 includes one or more processing chips and/or assemblies, such as numerous multi-core CPUs (central processing units). The memory 140 includes both volatile memory, e.g., RAM (Random Access Memory), and non-volatile memory, such as one or more ROMs (Read-Only Memories), disk drives, solid state drives, and the like. The set of processing units 134 and the memory 140 together form control circuitry, which is constructed and arranged to carry out various methods and functions as described herein. Also, the memory 140 includes a variety of software constructs realized in the form of executable instructions. When the executable instructions are run by the set of processing units 134, the set of processing units 134 is made to carry out the operations of the software constructs. Although certain software constructs are specifically shown and described, it is understood that the memory 140 typically includes many other software components, which are not shown, such as an operating system, various applications, processes, and daemons.

As further shown in FIG. 1, the memory 140 "includes," i.e., realizes by execution of software instructions, a cache 150, a data reduction manager 160, and a deduplication ("dedupe") index 170. The cache 150 is configured to store incoming data received from hosts 110 until the data can be persisted in storage 180. The cache 150 may arrange such data in pages 152, also referred to herein as "blocks" or "datasets." Pages 152 may have a uniform size, such as 4 kB, 8 kB, or the like. In an example, the data storage system 120 is configured to receive host data in I/O requests 112. Such host data may have variable size, such as 4 kB, 8 kB, 16 kB, and/or 32 kB, for example. Regardless of the size of the data received, the cache 150 arranges the data in cache pages 172, which may have uniform size, as indicated above.

Data reduction manager 160 is configured to reduce the amount of data that the data storage system 120 must store. For example, data reduction manager 160 is configured to perform data compression and data deduplication.

Data compression may include both self-compression and dictionary-based compression. Self-compression is configured to operate on a page of data as a self-contained unit, without referencing any contents outside the page. In contrast, dictionary-based compression is configured to compress one page with reference to the dictionary of another page. Dictionary compression is computationally expensive but provides high compression ratios for similar pages.

Data deduplication as provided herein includes similarity-based deduplication, i.e., deduplication that uses similarity hashes (sim-hashes) as digests, in place of or in addition to conventional cryptographic or semi-cryptographic hashes. Sim-hashes are designed to produce the same output for similar data but to produce different output for more different data. Various sim-hashes have been proposed, and different sim-hashes may have different tolerances for differences in data before generating different results. One example of a sim-hash is disclosed in copending U.S. patent application Ser. No. 17/081,007, filed Oct. 27, 2020. Another example is disclosed in copending U.S. patent application Ser. No. 17/155,224, filed Jan. 22, 2021. The contents and teachings of both of these applications are incorporated by reference herein in their entirety.

Data reduction manager 160 is configured to reference the deduplication index 170 when performing deduplication. As shown, the deduplication index 170 includes multiple entries 172. The entries 172 relate sim-hashes generated from previously processed pages to corresponding locations where the respective pages can be found. The locations may be addresses in cache 150 or in storage 180, for example.

In example operation, hosts 110 issue I/O requests 112 to the data storage system 120. The communication interface(s) of storage nodes 130 receive the I/O requests 112 and initiate further processing. For example, storage node 130*a* receives I/O requests 112 specifying data to be written in the data storage system 120 and temporarily stores such data in cache 150, where the data are organized in pages 152. Data reduction manager 160 may then attempt to perform data reduction on the newly-cached pages 152.

For example, data reduction manager 160 selects one of the pages 152*c* as a candidate page and proceeds to compute a sim-hash of the candidate page 152*c*. The data reduction manager 160 may then perform a lookup or other search for the computed sim-hash in the deduplication index 170. If no match is found, the data reduction manager 160 may compress the candidate page 152*c* (e.g., using self-compression) and direct the compressed page to be written to storage 180. At this time, the data reduction manager 160 may create a new entry 172 for the candidate page 152*c* in the deduplication index 170. The new entry may include the sim-hash of the candidate page 152*c* and a location where the compressed page may be found.

If the lookup into the index 170 produces a match, however, the matching entry 172 identifies a target page 152*t*, i.e., a previously processed page that generated the same sim-hash. The target page 152*t* may be identical to the candidate page 152*c*, or it may be somewhat different (but not so different as to produce a different sim-hash). The data reduction manager 160 may then effectuate storage of the candidate page 152*c* by reference to the target page 152*t*.

In some examples, the data reduction manager 160 may perform a dictionary-based compression of the candidate page 152*b* using a dictionary of the compressed target page 152*t* as a reference. The dictionary of the compressed target page 152*t* may contain symbols that describe contents of the target page 152*t*, many of which may also be shared with the candidate page 152*c*. The compressed candidate page 152*c* refers to this dictionary to record instances of the same symbols in the candidate page 152*c*. Using dictionary compression, the candidate page 152*c* can compress to a very small size. In general, the more similar the candidate page is to the target page, the smaller the compressed size of the candidate page. In other examples, data reduction may include partial-page deduplication, e.g., where pointers are provided to the adjacent target dataset to identify shared data portions and where unique data portions of the adjacent candidate dataset are compressed and separately stored.

Figure 2:
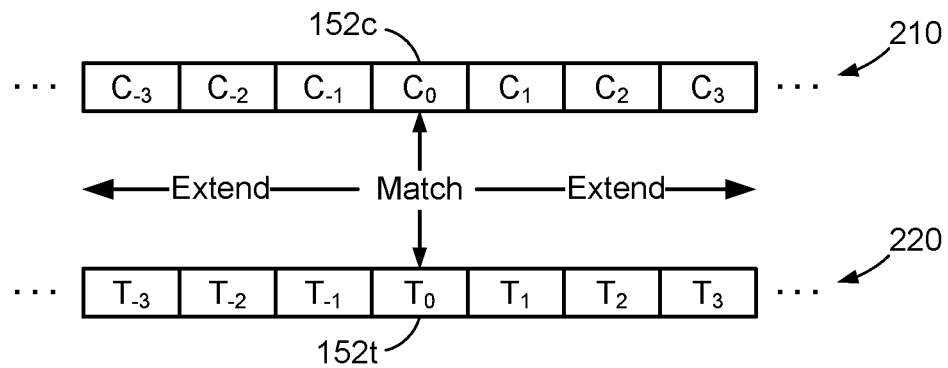
FIG. 2 is a block diagram showing example sequences of candidate pages and target pages.

In accordance with further improvements, the data reduction manager 160, having found a similarity match between a candidate page 152*c* and a target page 152*t*, may attempt to extend the match to adjacent pages. As shown in FIG. 2, for example, the candidate page 152*c* may be one of a sequence 210 of candidate pages in cache 150. For instance, the sequence 210 may have been received in one large host write, which the cache 150 arranged into individual pages 152, shown in FIG. 2 as $C_{-3}$, $C_{-2}$, $C_{-1}$, $C_0$, $C_1$, $C_2$, and $C_3$. The sequence 210 may alternatively have been received in multiple consecutive writes. Just as the candidate page 152*c* may belong to a sequence 210 of candidate pages, the target page 152*t*, at the time of its receipt, may also have belonged to a sequence 220 of target pages, shown as pages $T_{-3}$, $T_{-2}$, $T_{-1}$, $T_0$, $T_1$, $T_2$, and $T_3$. In an example, the sequence 220 of target pages remains in cache 150 and may be obtained therefrom. Alternatively, it may be obtained from storage 180.

Given that a similarity match was found between pages $C_0$ and $T_0$ (152*c* and 152*t*), it is plausible if not likely that similarity matches may also be found between corresponding adjacent pages, e.g., between $C_1$ and $T_1$, between $C_2$ and $T_2$, and so on, in both directions. However, given that sim-hashes may be strict calculations that can exclude many similar pages, it is possible that $C_0$ and $T_0$ may be the only pages in the respective sequences 210 and 220 that produce a sim-hash match. But this does not necessarily mean that $C_0$ and $T_0$ are the only pairs of pages that are similar.

Knowing whether two pages are similar can be a significant factor in promoting efficient data reduction. For example, dictionary compression is a preferred approach for compressing pages with high similarity, as it yields high levels of compression for such pages. But dictionary compression is computationally burdensome, involves more overhead than self-compression, and yields no better results than self-compression when pages are significantly different. In such cases, self-compression may be the better choice. Indeed, there is a threshold level of similarity above which the best choice is dictionary compression and below which the best choice is self-compression. Sim-hashes do not typically enable fine distinctions to be made relative to this threshold, however.

In cases such as the one shown in FIG. 2, where there is good reason to believe that adjacent candidate pages may be similar to adjacent target pages, extra processing is justified for resolving similarity relative to the above-described threshold. In these cases, the data reduction manager 160 may direct more accurate similarity assessments. Such similarity assessments may be performed, for example, between adjacent candidate pages and corresponding adjacent target pages, such as between $C_1$ and $T_1$, between $C_2$ and $T_2$, and so forth, in both directions.

Similarity assessments may take a variety of forms. These may include a brute force approach whereby pages are compared byte-for-byte, with similarities and differences identified. Such an approach is inefficient, however.

Figure 3:
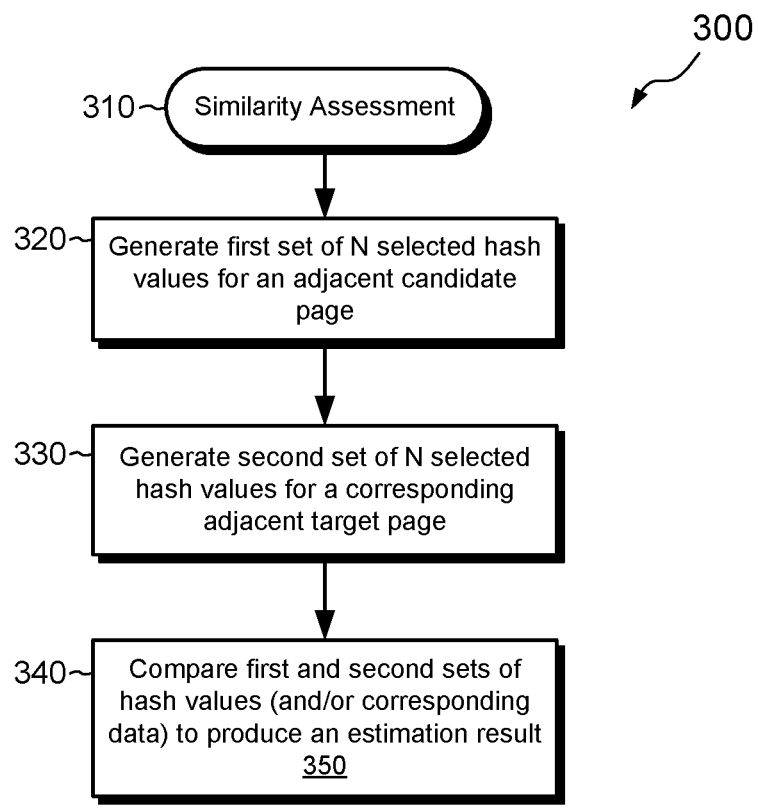
FIG. 3 is a flowchart showing an example method of performing a similarity assessment.

FIG. 3 shows an example method 300 of producing a similarity assessment 310 in a more efficient manner. At 320, a first set of N selected hash values is selected for an adjacent candidate page, such as $C_1$ or $C_2$, for example. Likewise, at 330 a second set of N selected hash values is selected for an adjacent target page, such as $T_1$ or $T_2$, for example. In a particular example, the adjacent page (candidate or target) is rendered as multiple regions of M bytes each, where M equals 4, 8, or some other integer (a value of 4 has been found to yield favorable results). A respective hash value is generated from each of the multiple regions, and N of those regions are selected as representatives. Selections of regions as representatives may be based on hash values. For example, the N selected regions may be the regions that produce the N largest hash values, or those that produce the N smallest hash values (or those that correspond to any other identifiable range of N hash values). For efficiency, the hash values may be produced using a simple hash function, such as prime multiplication.

At 340, hash values and/or underlying data associated with the N selected regions of the adjacent candidate page (first set) are compared with hash values and/or underlying data associated with the N selected regions of the adjacent target page (second set), and an estimation result 350 is produced. As one example, the data reduction manager 160 may search for each of the N selected regions of the adjacent candidate page within the N selected regions of the adjacent target page, counting each region that matches. The estimation result 350 may then be set to the resulting count of matched regions. Larger counts indicate higher levels of similarity.

As another example, the data reduction manager 160 may compare hash values rather than data. For instance, the data reduction manager 160 iterates over each of N hash values for the N selected regions of the adjacent candidate page and checks for a match to one of the N selected regions of the adjacent target page, returning the total count of matches as the estimation result 350. In some examples, comparing hash values is the manner by which data of the selection regions are compared.

In general, the greater the value of N (the number of selected regions), the greater the accuracy of estimation results 350, i.e., the better the estimation results 350 will reflect actual similarity between two pages. A value of N=10 may provide a minimum effective value, with values of 32 providing favorable results. These are merely examples, however.

In a particular example, the processing workload associated with performing the similarity assessment 310 leverages computations that may already be performed, as part of generating sim-hashes. Thus, performing similarity assessments 310 may be achieved at low computational cost.

Figure 4:
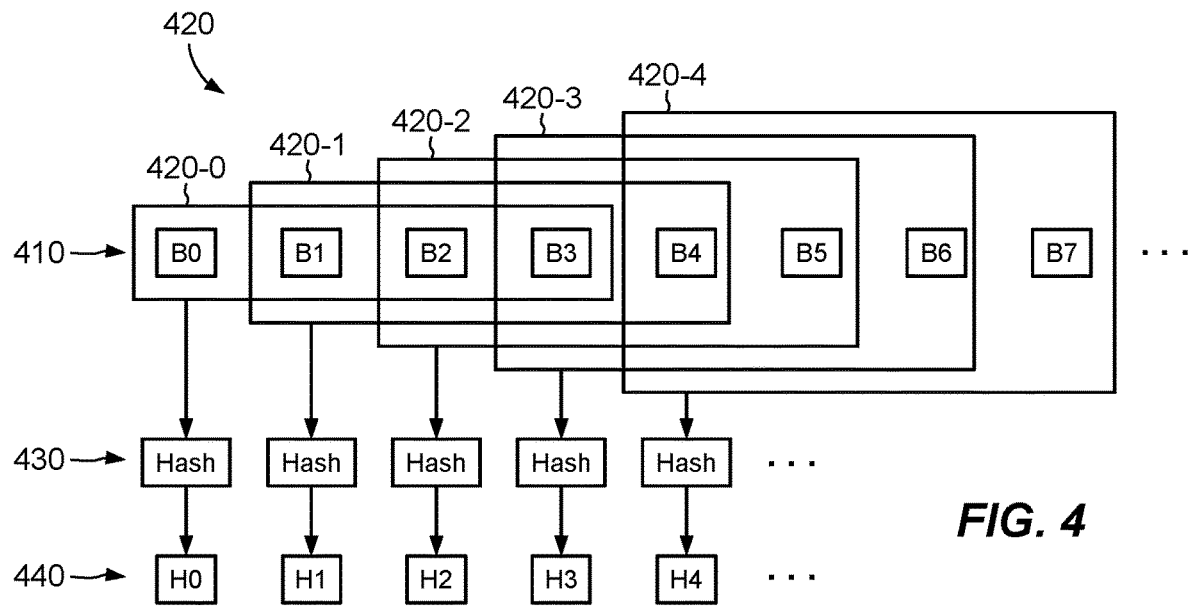
FIG. 4 is a block diagram showing an example arrangement for generating a similarity hash from a page of data, which may also be used in performing a similarity assessment.

FIG. 4 shows an example arrangement for generating a sim-hash of a page 410, which arrangement may also be leveraged for producing a similarity assessment 310. As shown, the page 410 includes a series of consecutive bytes. Bytes B0-B7 are specifically labeled, with the understanding that page 410 may include many more bytes, such as a total of 4 kB, 8 kB, or the like. A sliding window 420 may be applied to the page 410. At a first position 420-0, the window 420 includes bytes B0-B3 (4 bytes). A hash function 430 (e.g., one based on prime multiplication) generates a hash value H0 of the bytes within the window 420. Although H0 is computed from bytes B0-B3, it is associated by convention with byte B0.

Next, the window 220 advances to position 420-1, where it encompasses bytes B1-B4. Hash function 430 computes hash value H1, which is then associated with byte B1. The window 220 then advances in turn to positions 420-2, 420-3, 420-4, and so on, resulting in production of hash values H2, H3, H4, and so on. At the end of operation, there are approximately the same number of hash values 440 as there are bytes in the page 410 (the final 3 bytes may be skipped). From this large set of hash values 440, N hash values are selected as representatives. One may appreciate that the hash computations of FIG. 4 need not be performed sequentially. Indeed, parallel processing of hash functions for respective positions of the window 220 may be preferred.

Figure 5:
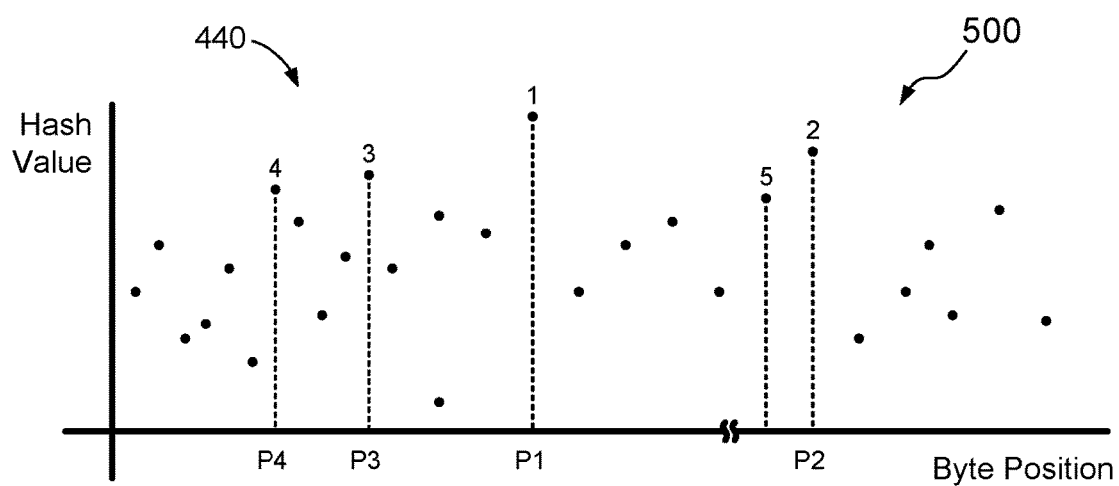
FIG. 5 is a graph showing an example arrangement for selecting representative regions of the page of data when generating a similarity hash or performing a similarity assessment.

FIG. 5 shows an example arrangement for choosing selected hash values and thus selected regions of a page. Here, graph 500 shows the hash values 440 computed in connection with FIG. 4 versus byte position. For generating a sim-hash 520, the data reduction manager 160 takes a number (e.g., 5) of the largest (or smallest) hash values 440, such as those indicated by numerals 1-5. As shown, byte position P1 is the position of the byte within page 410 for which the largest hash value 440 is produced. P1 corresponds to a grouping of M=4 bytes of data, which is associated with the first byte in the grouping. Likewise, byte position P2 is the position of the first byte for which the next largest hash value 440 is produced, and so on up to P5.

Equation 510 shows an example sim-hash computation. The example is intended to be illustrative rather than limiting. Here, a sim-hash 520 is computed as a hash of a concatenation of the data at the 5 selected positions ("G" represents a group of M=4 bytes of data from which the selected hash value is computed). The sim-hash 520 in this example is thus based on only 20 bytes of data, 4 bytes per region times a total of 5 regions (e.g., those associated with the largest hash values). For sim-hash-based deduplication, these 20 bytes may be representative of an entire page.

Although generation of sim-hashes is deterministic, it is also sparse. One can see that large regions of data are ignored. Also, a change in just one of the selected regions may result in a completely different sim-hash 520.

In an example, the similarity assessment 310 uses the same computational approach as does the sim-hash 520, except that, rather than considering only N=5 selected regions as representatives, the similarity assessment 310 uses a larger number, such as N=10 or N=32 or more. Also, unlike the sim-hash 520, which yields a strict, binary result (equal or not), the estimation result 350 is more granular, as it is based on numbers of matches between pages of selected regions, rather than on an overall hash value, for example.

Figure 6:
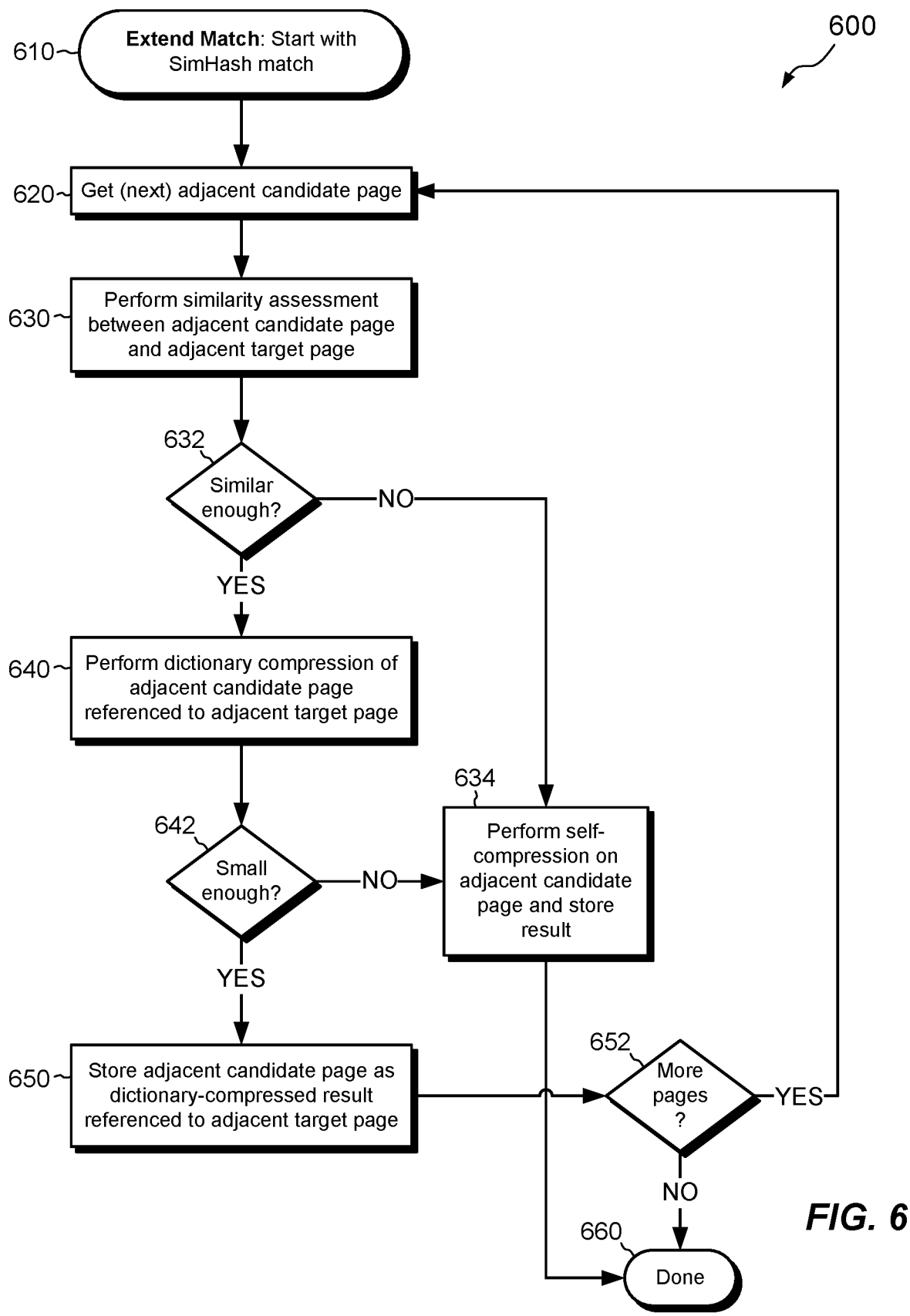
FIG. 6 is a flowchart showing an example method of extending a similarity-based deduplication match to adjacent pages.
Figure 7:
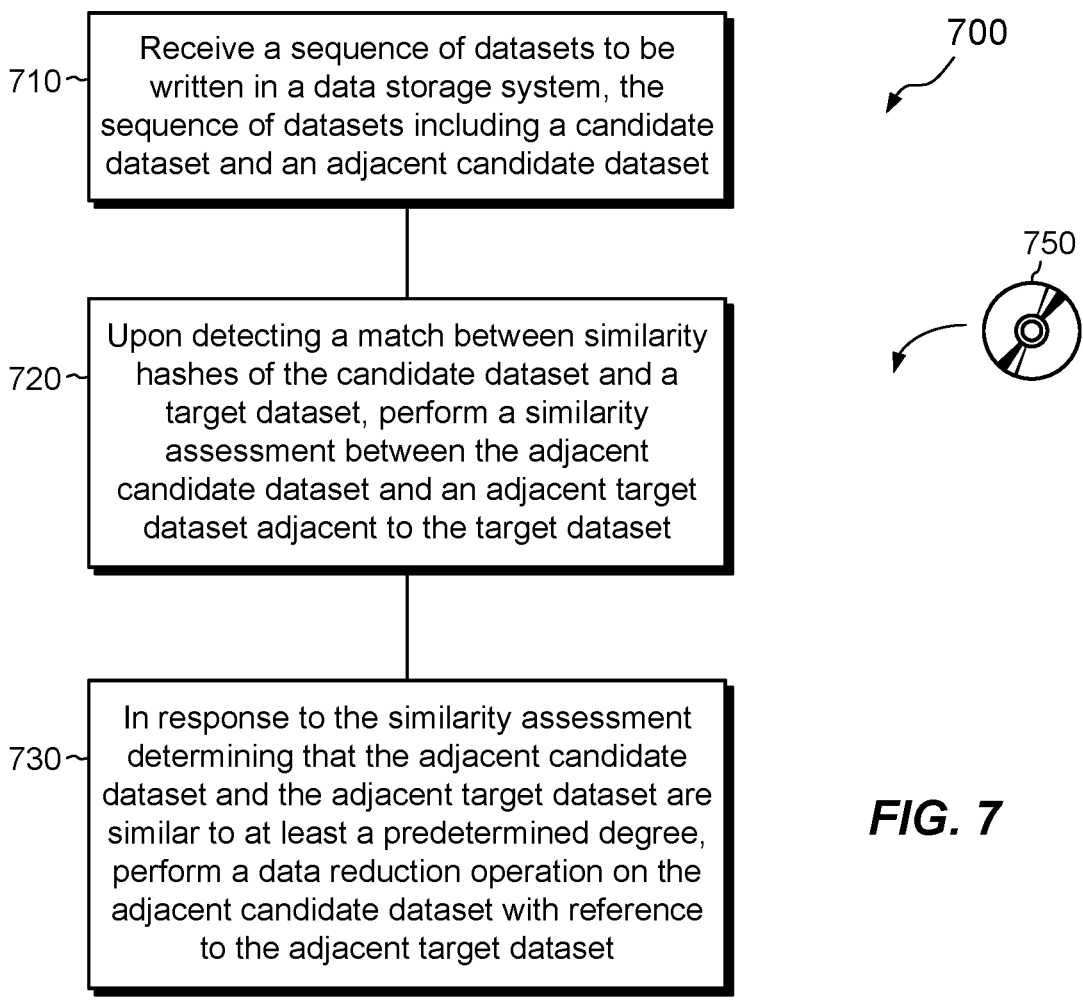
FIG. 7 is a flowchart showing an example method of performing data reduction.

FIGS. 6 and 7 show example methods 600 and 700 that may be carried out in connection with the environment 100. The methods 600 and 700 are typically performed, for example, by the software constructs described in connection with FIG. 1, which reside in the memory 140 of a storage node 130a and are run by the set of processing units 134. The various acts of methods 600 and 700 may be ordered in any suitable way. Accordingly, embodiments may be constructed in which acts are performed in orders different from those illustrated, which may include performing some acts simultaneously.

FIG. 6 shows an example method 600 for extending a sim-hash-based deduplication match to adjacent pages. Operation of method 600 starts at 610, where a similarity-based page deduplication is confirmed, e.g., between the candidate page 152c and the target page 152t (FIG. 1). In an example, the data reduction manager 160 performs sim-hash lookups into the deduplication index 170 in batches, which may include many pages. Thus, method 600 need not check for additional sim-hash matches when checking adjacent pages, as such checking may already have been done.

At 620, method 600 obtains an adjacent candidate page, such as page $C_1$ (FIG. 2). Operation then proceeds to 630, whereupon method 600 performs a similarity assessment 310, e.g., as described in connection with FIGS. 3-5 above. The similarity assessment 310 compares the adjacent candidate page (e.g., $C_1$) with the corresponding adjacent target page (e.g., $T_1$) and produces an estimation result 350.

At 632, method 600 determines whether the estimation result 350 indicates a sufficient level of similarity to justify dictionary-based compression. For example, the estimation result 350 provides a count of matching regions between the adjacent candidate page and the corresponding adjacent target page. Depending on circumstances (such as system load), sufficiency of similarity may be found with as few as 3 or as many as 10 or more matches.

If at 632 similarity is not deemed sufficient, then at 634 method 600 performs self-compression on the adjacent candidate page and stores the result, i.e., without reference to the adjacent target page. The method 600 then ends at 660.

However, if at 632 similarity is deemed sufficient, the operation proceeds to 640, whereupon method 600 performs dictionary-based compression of the adjacent candidate page with reference to the adjacent target page, i.e., with reference to the dictionary of the compressed adjacent target page.

At 642, method 600 determines whether the dictionary-based compression produced a small-enough compressed result, e.g., whether the dictionary-based compression resulted in data reduction beyond some threshold degree. If the answer at 642 is NO, then operation proceeds to 634 (self-compression) and then operation completes at 660. Self-compression at this point may be considered optional in some embodiments, as the page has already been dictionary-compressed. But given that dictionary compression involves higher overhead (e.g., during decompression), the preferred course may still be to use self-compression for cases where the answer at 642 is NO.

Commonly, however, the answer at 642 is YES, and operation proceeds to 650, whereupon the results of the dictionary-based compression at 640 are stored. Given that similarity was confirmed and dictionary-based compression was successful, method 600 may check for more pages in the sequence (at 652) and, if there are any such pages, proceed to the next adjacent candidate page (e.g., $C_2$), by returning to 620, where the next adjacent candidate page is processed as was the previous. Operation continues in this manner until there are no more pages in the sequence or until dictionary-based compression fails to give good results or is not selected. One should appreciate that the method 600 may process adjacent pages both forward and back from the original candidate page $C_0$ and the original target page $T_0$. For example, method 600 may be performed once in the forward direction and once in the reverse direction. Operation may proceed in both directions in parallel, for example.

One should appreciate that the efficiency of method 600 depends largely on the accuracy of similarity assessments 310. For example, the more accurate the similarity assessments 310, the fewer times the NO path from decision 642 has to be followed. This NO path involves a wasted dictionary-compression attempt and thus places a burden on computational resources without any compensating benefit. In contrast, accurate similarity assessments 310 enable decision 632 to screen out bad candidates for dictionary compression (by producing NO results at 632), thus avoiding the waste of resources which would occur without such screening.

FIG. 7 shows an example method 700 of managing data reduction. Method 700 also provides a summary of some of the features described above.

At 710, a sequence 210 is received of datasets to be written in a data storage system 120. The datasets may include pages, blocks, or other addressable storage elements. The sequence 210 of datasets includes a candidate dataset $C_0$ (152c) and an adjacent candidate dataset, such as $C_1$ (or $C_{-1}$).

At 720, upon detecting a match between similarity hashes 520 of the candidate dataset $C_0$ and a target dataset, e.g., $T_0$, a similarity assessment 310 is performed between the adjacent candidate dataset $C_1$ (or $C_{-1}$) and an adjacent target dataset $T_1$ (or $T_{-1}$) adjacent to the target dataset $T_0$.

At 730, in response to the similarity assessment 310 determining that the adjacent candidate dataset and the adjacent target dataset are similar to at least a predetermined degree (such as a required number of matching regions identified in the estimation results 350), a data reduction operation is performed on the adjacent candidate dataset with reference to the adjacent target dataset. The data reduction operation may include a dictionary-based compression that uses a compression dictionary associated with the adjacent target dataset, for example. Other examples of the data reduction operation may include partial-page deduplication, e.g., where pointers to the adjacent target dataset identify shared data portions and where unique data portions of the adjacent candidate dataset are compressed and stored separately.

An improved technique of performing data reduction has been described. The technique includes, upon detecting a match between similarity hashes 520 of a candidate dataset $C_0$ and a target dataset $T_0$, evaluating an adjacent candidate dataset (e.g., $C_1$ or $C_{-1}$) and an adjacent target dataset (e.g., $T_1$ or $T_{-1}$) for similarity with each other and, in response to confirming such similarity, performing data reduction of the adjacent candidate dataset with reference to the adjacent target dataset. Advantageously, the improved technique enables data reduction choices to be made based on similarity, thus promoting more effective data reduction and a more efficient use of computing resources.

Experimental results have demonstrated that similarity assessments 310 provide an effective basis for steering decisions about compression choices. Without similarity assessment 310, it has been observed that dictionary-based compression is a poor choice for compressing data of adjacent pages about 55% of the time. By "poor choice" it is meant that dictionary-based compression results in lesser compression than self-compression or that it otherwise does not justify the computational cost.

Results quickly improve, however, when similarity assessment 310 is performed. For example, performing similarity assessment 310 that requires only 2 matching regions (out of 32) improves results by over 10% (to a 43% poor-choice rate), and requiring 10 matching regions improves results by nearly 50% (to a 5.6% poor-choice rate). Requiring 14 matching regions drives the poor-choice rate below 1%. This means that using similarity assessment 310 to decide whether to use dictionary-based compression or self-compression produces the best choice over 99% of the time, if requiring at least 14 matches. Given that dictionary-based compression is much more computationally expensive than similarity assessment 310, the small performance penalty of similarity assessment 310 is clearly justified.

Having described certain embodiments, numerous alternative embodiments or variations can be made. For example, although embodiments have been described in connection with pages 152, this is merely an example, as the principles disclosed herein may be applied to datasets of any kind.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of performing data reduction, comprising:
receiving a sequence of datasets to be written in a data storage system, the sequence of datasets including a candidate dataset and an adjacent candidate dataset;
upon detecting a match between similarity hashes of the candidate dataset and a target dataset, performing a similarity assessment between the adjacent candidate dataset and an adjacent target dataset adjacent to the target dataset; and
in response to the similarity assessment determining that the adjacent candidate dataset and the adjacent target dataset are similar to at least a predetermined degree, performing a data reduction operation on the adjacent candidate dataset with reference to the adjacent target dataset,
wherein performing the similarity assessment includes:
accessing P hash values calculated from the adjacent candidate dataset and P hash values calculated from the adjacent target dataset;
selecting N of the P hash values, N<P and being less than one-tenth of P, of the adjacent candidate block based on a selection rule;
selecting N of the P hash values of the adjacent target block based on the same selection rule; and
determining that the adjacent candidate block is similar to the adjacent target block based at least in part on a number of matches between the N selected hash values of the adjacent candidate block and the N selected hash values of the adjacent target block.

2. The method of claim 1, wherein performing the data reduction operation includes performing a dictionary-based compression of the adjacent candidate dataset based on the adjacent target dataset.

3. The method of claim 2, further comprising:
performing a second similarity assessment between a second-adjacent candidate dataset adjacent to the adjacent candidate dataset and a second-adjacent target dataset adjacent to the adjacent target dataset; and
in response to the second similarity assessment determining that the second-adjacent candidate dataset and the second-adjacent target dataset are not similar to at least the predetermined degree, performing a data reduction operation on the second-adjacent candidate dataset without reference to the second-adjacent target dataset.

4. The method of claim 3, wherein performing the data reduction operation on the second-adjacent candidate dataset includes performing a self-compression of the second-adjacent candidate dataset.

5. The method of claim 1, wherein the N selected hash values of the adjacent candidate dataset are pre-computed by generating a similarity hash of the adjacent candidate dataset.

6. The method of claim 1, wherein selecting N of the P hash values of the adjacent candidate block based on the selection rule includes selecting one of (i) the N largest hash values of the P hash values or (ii) the N smallest hash values of the P hash values.

7. The method of claim 6, wherein each of the P hash values is calculated from a region that is at least 4 bytes long, and wherein the number N is at least 10.

8. A computerized apparatus, comprising control circuitry that includes a set of processing units coupled to memory, the control circuitry constructed and arranged to:
receive a sequence of datasets to be written in a data storage system, the sequence of datasets including a candidate dataset and an adjacent candidate dataset;
upon detection of a match between similarity hashes of the candidate dataset and a target dataset, perform a similarity assessment between the adjacent candidate dataset and an adjacent target dataset adjacent to the target dataset; and
in response to a determination by the similarity assessment that the adjacent candidate dataset and the adjacent target dataset are similar to at least a predetermined degree, perform a data reduction operation on the adjacent candidate dataset with reference to the adjacent target dataset,
wherein the control circuitry constructed and arranged to perform the similarity assessment is further constructed and arranged to:
access P hash values calculated from the adjacent candidate dataset and P hash values calculated from the adjacent target dataset;
select N of the P hash values, N<P and being less than one-tenth of P, of the adjacent candidate block based on a selection rule;
select N of the P hash values of the adjacent target block based on the same selection rule; and
determine that the adjacent candidate block is similar to the adjacent target block based at least in part on a number of matches between the N selected hash values of the adjacent candidate block and the N selected hash values of the adjacent target block.

9. The computerized apparatus of claim 8, wherein the control circuitry constructed and arranged to perform the data reduction operation is further constructed and arranged to perform a dictionary-based compression of the adjacent candidate dataset based on the adjacent target dataset.

10. A computer program product including a set of non-transitory, computer-readable media having instructions which, when executed by control circuitry of a computerized apparatus, cause the computerized apparatus to perform a method of performing data reduction, the method comprising:
- receiving a sequence of datasets to be written in a data storage system, the sequence of datasets including a candidate dataset and an adjacent candidate dataset;
- upon detecting a match between similarity hashes of the candidate dataset and a target dataset, performing a similarity assessment between the adjacent candidate dataset and an adjacent target dataset adjacent to the target dataset; and
- in response to the similarity assessment determining that the adjacent candidate dataset and the adjacent target dataset are similar to at least a predetermined degree, performing a data reduction operation on the adjacent candidate dataset with reference to the adjacent target dataset, wherein performing the similarity assessment includes:
- accessing P hash values calculated from the adjacent candidate dataset and P hash values calculated from the adjacent target dataset;
- selecting N of the P hash values, N<P and being less than one-tenth of P, of the adjacent candidate block based on a selection rule;
- selecting N of the P hash values of the adjacent target block based on the same selection rule; and
- determining that the adjacent candidate block is similar to the adjacent target block based at least in part on a number of matches between the N selected hash values of the adjacent candidate block and the N selected hash values of the adjacent target block.

11. The computer program product of claim 10, wherein the method further comprises:
- performing a second similarity assessment between a second-adjacent candidate dataset adjacent to the adjacent candidate dataset and a second-adjacent target dataset adjacent to the adjacent target dataset; and
- in response to the second similarity assessment determining that the second-adjacent candidate dataset and the second-adjacent target dataset are not similar to at least the predetermined degree, performing a data reduction operation on the second-adjacent candidate dataset without reference to the second-adjacent target dataset.

12. The computer program product of claim 11, wherein performing the data reduction operation on the second-adjacent candidate dataset includes performing a self-compression of the second-adjacent candidate dataset.

13. The computer program product of claim 10, wherein the N selected hash values of the adjacent candidate dataset are pre-computed by generating a similarity hash of the adjacent candidate dataset.

14. The computer program product of claim 10, wherein selecting N of the P hash values of the adjacent candidate block based on the selection rule includes selecting one of (i) the N largest hash values of the P hash values or (ii) the N smallest hash values of the P hash values.

15. The computer program product of claim 14, wherein each of the P hash values is calculated from a region that is at least 4 bytes long, and wherein the number N is at least 10.

16. The method of claim 1, wherein P is at least 100 times greater than N.

17. The method of claim 1, wherein the P hash values calculated from the adjacent candidate dataset are each calculated from a respective set of M consecutive bytes of the adjacent candidate dataset, and wherein each set of M consecutive bytes has at least one byte in common with at least one immediately adjacent set of M consecutive bytes.

* * * * *